United States Patent [19]
Derdall et al.

[11] Patent Number: 5,143,599
[45] Date of Patent: Sep. 1, 1992

[54] PROCESS FOR REFINING KAOLIN

[75] Inventors: Gary Derdall; Robin L. Phinney, both of Saskatoon, Canada

[73] Assignee: Kaolin Industries, Ltd., Saskatchewan, Canada

[21] Appl. No.: 736,801

[22] Filed: Jul. 29, 1991

[51] Int. Cl.$^5$ .................. B03D 1/02; B03D 1/08; B03D 1/10; C04B 33/04
[52] U.S. Cl. .................... 209/166; 209/10; 209/12; 209/39; 423/113; 423/118; 423/131; 423/132; 423/150; 501/146; 501/147; 501/148; 106/486; 106/487; 106/488
[58] Field of Search .......... 209/3, 10, 12, 39, 127.1, 209/166, 167, 164, 173, 214; 423/113, 118, 130, 131, 132, 150; 210/783, 710, 738, 723, 770, 771; 106/486, 488, 487; 501/144, 146, 148, 147

[56] References Cited

U.S. PATENT DOCUMENTS

| | | | |
|---|---|---|---|
| 2,990,958 | 7/1961 | Greene | 209/166 |
| 3,353,668 | 11/1967 | Duke | 209/10 |
| 3,471,011 | 10/1969 | Iannicelli | 209/214 |
| 3,616,900 | 11/1971 | Cecil | 209/5 |
| 3,670,883 | 6/1972 | Weir | 209/166 |
| 3,837,482 | 9/1974 | Sheridan | 209/5 |
| 3,861,934 | 1/1975 | Mallary | 209/166 |
| 4,097,372 | 6/1978 | Nott | 209/166 |
| 4,299,807 | 11/1981 | Angel | 423/118 |
| 4,401,638 | 8/1983 | Caballero | 209/166 |
| 4,419,228 | 12/1983 | Cook | 209/39 |
| 4,468,317 | 8/1984 | Turner | 209/166 |
| 4,492,628 | 1/1985 | Young | 209/166 |
| 4,618,374 | 10/1986 | Thompson | 106/486 |
| 4,629,556 | 12/1986 | Yoon | 209/166 |
| 4,943,324 | 7/1990 | Bundy | 106/486 |

Primary Examiner—Stanley S. Silverman
Assistant Examiner—Thomas M. Lithgow
Attorney, Agent, or Firm—Finnegan, Henderson, Farabow, Garrett & Dunner

[57] ABSTRACT

A process is disclosed for producing high brightness kaolin from ore containing silica, other types of clays, minerals such as ilmenite micas, feldspars and various metal silicates as well as organic matter. The process consists of sizing, a double floatation step, magnetic separation, leaching and oxidative brightening steps. This is a novel combination of conventional unit operations and in particular the use of a double floatation step to remove quartz and various trace minerals that interfere with achieving high optical brightness for kaolin.

25 Claims, 2 Drawing Sheets

PROCESS FOR REFINING KAOLIN

FIELD OF THE INVENTION

This invention is directed to a novel process for producing high brightness kaolin clay from surface or underground deposits of kaolinized sands containing an array of mineral and organic impurities. In particular, the process is directed towards removing quartz, ilmenite micas, feldspars and other trace minerals primarily by a double floatation process to produce a high brightness kaolin.

BACKGROUND OF THE INVENTION AND PRIOR ART

Kaolin clay is used in many industrial applications including pulp and paper and ceramics. In the paper industry, kaolin may be used to fill and coat fine paper. Filler grade kaolin of minus 2 micron size is required to have a brightness of 80 to 84 on the General Electric Brightness Standard used in the paper industry. Coating grade kaolin must have a higher brightness in a range of 83 to 89.

In the Wood Mountain and Willows formations in Southern Saskatchewan, there are extensive deposits of kaolinized sands in which quartz, feldspar and other impurities are present. These impurities contaminate the kaolin and lower its brightness level.

While there are many patents relating to the upgrading of kaolin to a high brightness level (which commands a significant premium in the market place), the prior art generally relates to specific unit operations which are incremental improvements to common practice or other prior art. The prior art by being directed to individual operations does not therefore contain a combination of unit operations laid out in a unique manner to process a variety of kaolin reserves and in particular those containing significant amounts of fine silica, feldspar and other minerals which detrimentally affects optical properties and can be an abrasive factor for paper making machines.

For example, there are patents dealing with oxidative bleaching such as U.S. Pat. Nos. 4,618,374 3,353,668, 3,655,038, Canadian Patent 1,090,833. Impurities leaching is dealt with in Canadian Patent 852,775; magnetic separation in Canadian Patent 991,609, Canadian Patent 1,023,770, U.S. Pat. Nos. 3,471,011, 4,419,228, 3,371,988; and a range of flocculation approaches is discussed in Canadian Patent 991,658, Canadian Patent 982,161, Canadian Patent 868,957, U.S. Pat. Nos. 3,850,653, 3,837,482, 3,737,333, and 3,725,100. Floatation techniques are disclosed, for example, in U.S. Pat. Nos. 4,629,556, 3,224,582, 3,861,934, 4,098,688, 4,518,491, 4,472,271 or Canadian Patent 1,045,642.

Conventional unit operations, or obvious combinations of technology such as noted above, are apparently unable to deal with the deposits of kaolin found in Saskatchewan which are known to contain substantial amounts of silica, feldspar, titanoferrometallics, metallic minerals and organics since no commercial plant exist despite the good freight and logical market such an operation would have. Most of the prior art deals with kaolin deposits such as those found in Georgia which have run of mine brightness levels in the 75–80 range whereas deposits such as those found in Saskatchewan have significantly lower brightness level in the range of 60 to 70. Therefore, the Saskatchewan deposits therefore present significant problems in upgrading the kaolin to filler and coating grade specifications.

Kaolinized sand deposits such as those found in Southern Saskatchewan contain a wide range of impurities that have prevented the commercialization of these deposits because the impurities have a detrimental effect on the chemical and physical properties of the kaolin. In addition to quartz and various silicates, there are a variety of metal based minerals in the deposit which effect the behaviour of the kaolin. These minerals are based on metals such as iron, titanium, zirconium, copper, zinc, calcium, and potassium and sodium with others dependent upon the location in the deposit. In "Economic Minerals of Saskatchewan" Special Publication #8 of the Saskatchewan Geological Society, Master reports that the deposit contains quartz, muscovite, oligoclase and various feldspars in conjunction with the kaolin. Hudson, in the same report indicates that coarse and fine kaolin contain iron, titanium, calcium, magnesium, sodium and potassium. In addition, the deposit contains organic matter which can range as high as 0.05%. It will be recognized by those skilled in the art that even small amounts of some of these impurities can make upgrading of the kaolin deposit to the lower brightness filler grade challenging and make the production of high brightness coating grades of kaolin very difficult.

SUMMARY OF THE INVENTION

The approach taken in this process has been to separate out surface active impurities such as silica and certain silicates such as feldspars and minerals like ilmenite using floatation techniques. Other impurities of a magnetic and paramagnetic nature are scavenged or removed using high intensity magnetic fields. Impurities such as copper, zinc and various metal oxides are taken into solution using a sulphite leach which also attacks and solubilizes certain polar organics found in the kaolin. An oxidation step may then surface brighten any remaining contaminants or take them into solution.

BRIEF DESCRIPTION OF THE DRAWINGS

The invention is illustrated by way of example in the accompanying drawings in which.

DESCRIPTION OF THE INVENTION

Figure 1:
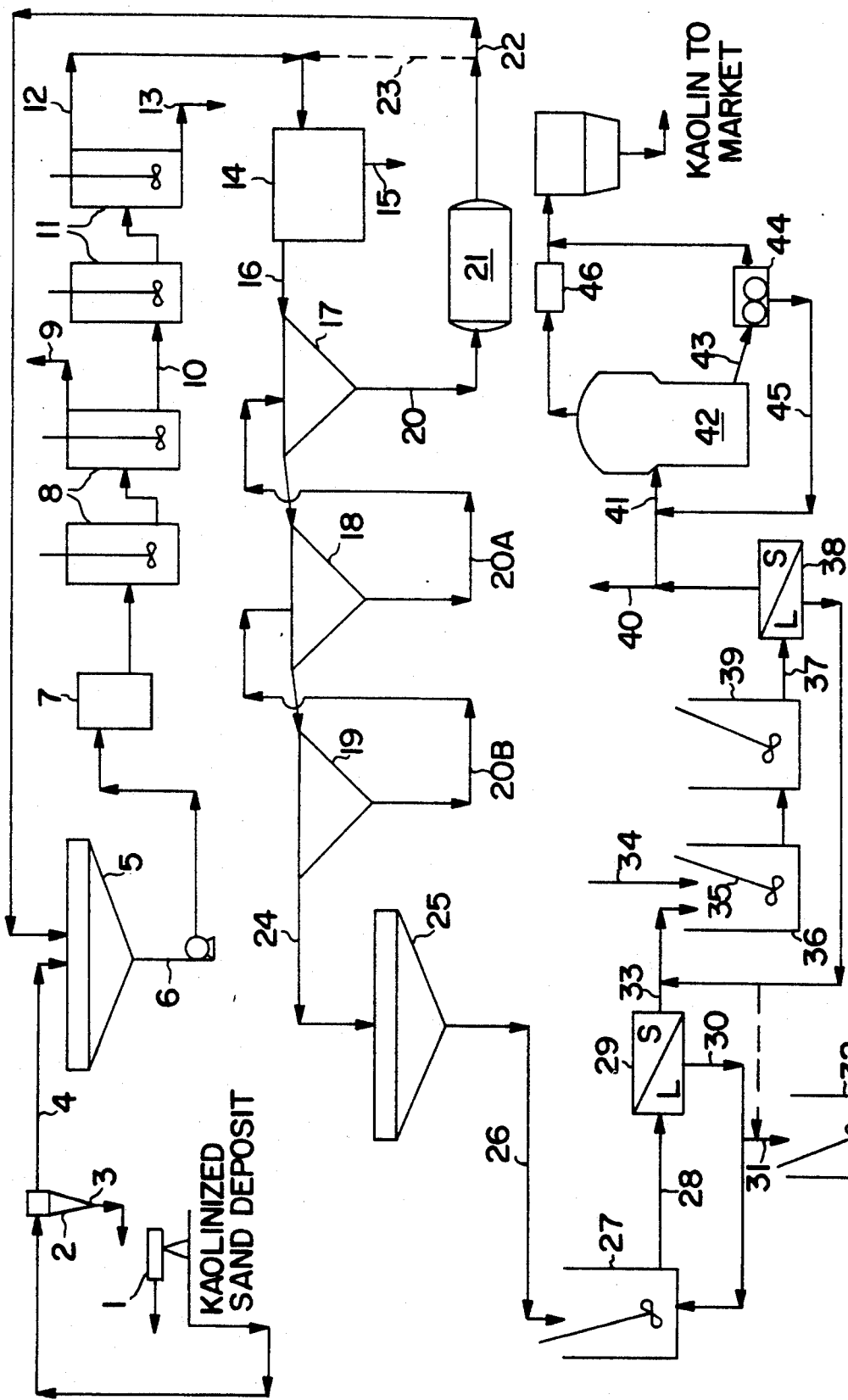
FIG. 1 is a flow chart of the main steps in the kaolin sand purification process of the present invention.
Figure 2:
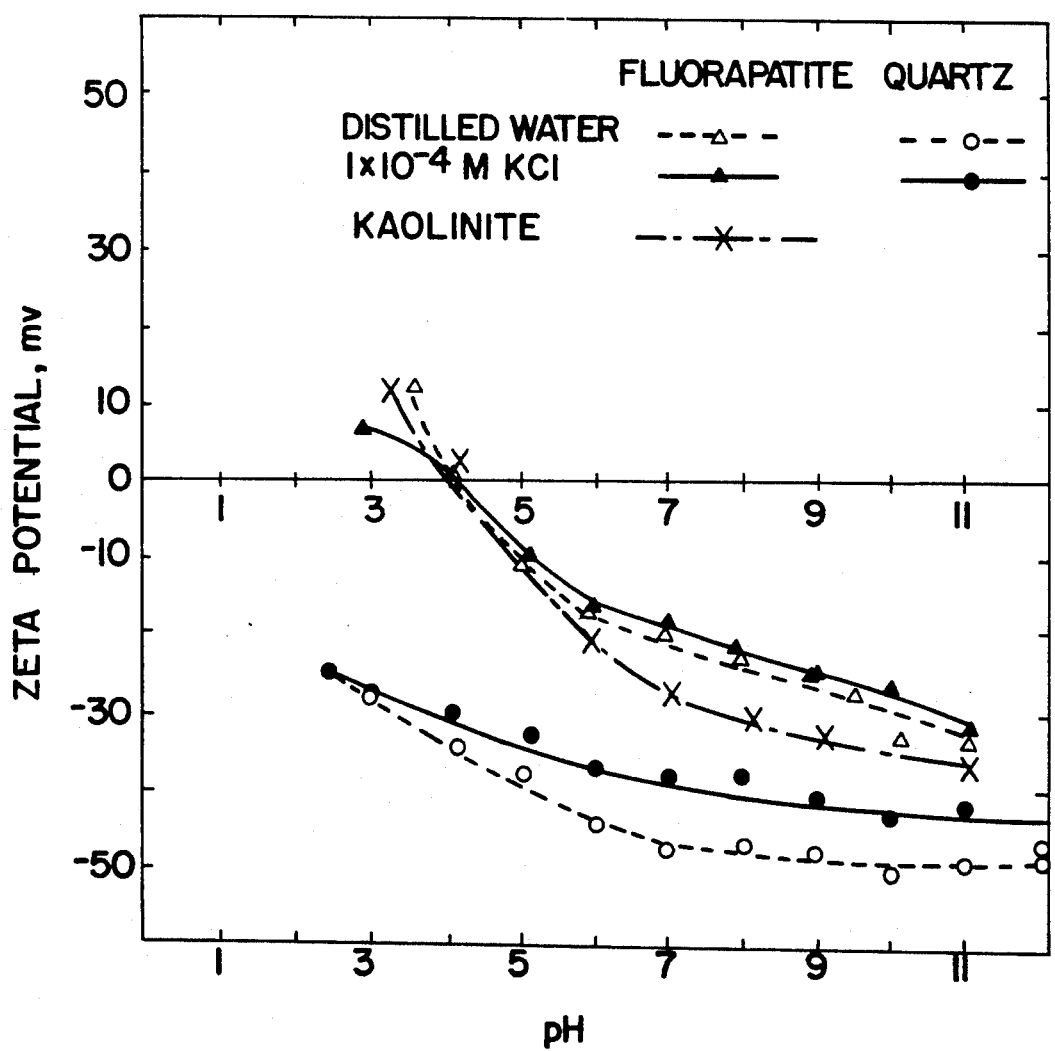
FIG. 2 is a graphic illustration of the relationship between the pH and zeta potential of kaolin, quartz and fluorapatite as presented by A. C. de Araujo et al at the 87th C.I.M.M. Annual General Meeting.

As may be seen in FIG. 1, the crude kaolinized sand is first broken down using water cannon 1, and pumped to a cyclone separator 2. Material above 35 microns in size is returned for further reduction through stream 3. The material below 35 microns is sent as stream 4 to a thickener 5 where the underflow in stream 6 is sent to a conditioning tank 7 where the pH is adjusted to between 9 and 11 to activate various impurities particularly the silica and the feldspars. The stream is then sent to a first floatation separation stage 8 which uses a fatty acid and fatty acid amine collectors and a mildly polar frother. It is well known in the phosphate industry that silica floats under these conditions. With reference to FIG. 2 it will be seen that the zeta potential difference between silica and kaolin indicates that some portion of the silica will float under these conditions. Inasmuch as the silica and other impurities to be floated are very fine, it must be a quiescent float and must be extremely fine bubbles such as the Wifley Weber cell that uses a perforated plate to generate fine bubbles An advantage of floatation under these conditions is that some titaniferous impurities will be removed as disclosed in U.S. Pat. No. 2,990,958 without recourse to the use of slipstreams to reduce kaolin entrainment. Unlike the requirements of U.S. Pat. No. 3,861,934, this process uses no oxidation step at this stage in the process and floats some silica and some sodium substituted feldspars as well as some ilmenite. The float concentrate containing floated silicas is rejected in stream 9.

After alkaline floatation, the floatation tails including the kaolin are removed in a slurry stream 10 which is thickened and the pH is lowered to about 3 to 5 using sulphur dioxide. The stream is sent to a second froth floatation separation stage 11. Again a quiescent float is used with very active particles. Under these conditions, the use of a fatty acids and ethylenediamine will settle and remove feldspar which was surface activated by alkaline conditioning in the floatation tail. The floatation concentrate will contain the kaolin, and is removed from the floatation tanks in a kaolin-bearing stream 12, while the tails containing feldspar are rejected in stream 13. As will be noted from FIG. 2, this is the region of maximum difference in zeta potential between the kaolin and silica and the remainder of the silica and feldspars will be removed at this point.

The kaolin stream is then sent to a high intensity (10,000 to 30,000 gauss) magnetic field in a separator 14 at a low solids density of typically 5%. This low solids density is important in the operation of the magnetic separator and the retention of weakly held paramagnetics is accomplished by using low solids densities rather than the typical 15-20% solids densities used with magnetic separators since high solids densities tend to scour off the weakly held paramagnetics.

Stream 15 containing colour minerals is rejected while kaolin-bearing stream 16, with the addition of a dispersant, is sent to the cone classifiers 17, 18 and 19 such as a Spitz Kazen core classifier. Alternatively, a more modern decanter centrifuge may be employed to give even finer cuts. It can be seen from FIG. 1 that it is possible to take the natural size fractionation of the reserve with exit streams 20, 20A, and 20B or all the material greater than 2 microns may be recycled or there may be some intermediate mode of size classification. If recycle is employed, material from stream 20 is sent to a tower mill 21 for grinding and size reduction. As well as reducing the size of the kaolin, this operation surface brightens the kaolin as well as liberating contaminants to be removed either by complete recycle as with stream 22 or by partial recycle by steam 23 depending upon the impurities liberated during grinding.

Stream 24 containing the 2 micron material is sent to a settlement tank or thickener 25 and the underflow stream 26 is sent to a reactor tank 27 where the pH is kept on the acid side preferably below a pH of 3 by the use of sulphuric acid and the addition of sulphur dioxide and sodium bisulphite as needed. This is an important step as many metals such as copper, zinc and residual trace metals oxides are taken into solution. As well, polar organics are taken into solution as well. The residence time and temperature of the leach step are variable depending upon site specific impurity deportment. A reducing agent such, as sodium sulphide or hydrogen sulphide is added to take residual nonmagnetic iron such geotite into solution in the form of ferrous ion.

Stream 28 passes to a disc filter 29 and the leach solution in stream 30 is recycled, with a bleed stream 31 taken off and neutralized in tank 32 so that impurities are removed from the leach solution. The kaolin cake in stream 33 is diluted at stream 34 and then sent through a repulper 35 to an oxidation step using sodium chlorate or ozone to surface brighten remaining contaminants and remove residual organics in tank 36. The temperature and residence time can be varied to suit site specific impurity deportment. The kaolin is then sent in a stream 37 to a belt press filter 38 after flocculation in tank 39 using aluminum sulphate. The kaolin can then be sent to market as a high density wet cake (stream 40) or sent on for processing to a dry material (stream 41). The dry material may be calcinated at the dryer 42 to further enhance surface brightness. Oversize materials may be recycled in stream 43 through pulverizer 44 and returned by stream 45 to the system. Electrostatic precipitators 46 may remove further silica. The kaolin may then be packaged for market, or optionally, the dried material may be air classified to plus and minus one micron for markets requiring very fine material.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

The embodiments of the invention in which an exclusive property or privilege is claimed are defined as follows:

1. A process for producing kaolin of enhanced brightness from kaolinized sand deposits containing silica, quartz, feldspar, ilmenite or other minerals and having a low grade and brightness level, comprising the steps of:
   extracting kaolin-bearing ore from said deposits;
   reducing the size of said ore and rejecting material of greater than 35 micron size;
   subjecting the minus 35 micron kaolin-bearing material to a first froth floatation separation operation under quiescent alkaline conditions to separate the float concentrate from the float tails;
   rejecting the float concentrate containing at least a portion of the silica impurities;
   thickening and acidifying the kaolin-bearing float tails;
   subjecting the float tails to a second froth floatation separation operation under quiescent acidic conditions;
   removing the second float concentrate as a kaolin-bearing stream;
   exposing the kaolin-bearing stream at a low solids density to a high intensity magnetic field to separate and reject paramagnetic minerals from the kaolin stream;
   size classifying the kaolin-bearing stream from the high intensity magnetic field into at least two streams, one of which streams is a 2 micron stream containing particulate matter of generally 2 microns or less, and the remainder of said streams containing particulate matter generally greater than 2 micron;
   rejecting the streams of greater than 2 micron matter;
   leaching the generally 2 micron or less stream to dissolve ferrous iron;
   dewatering the 2 micron stream and recovering the kaolin therein.

2. The kaolin enhancing process of claim 1 wherein the first alkaline float has a pH between 9 and 11.

3. The kaolin enhancing process of claim 1, wherein the first alkaline float uses organic collectors and mildly polar frothing agent t float impurities.

4. The kaolin enhancing process of claim wherein the impurities are potassium and calcium based silicas.

5. The kaolin enhancing process of claim 1, wherein the second acid float has a pH between 3 and 5.

6. The kaolin enhancing process of claim 5, wherein the second acidic float uses fatty acids and ethylene diamine as collectors to float kaolin.

7. The kaolin enhancing process of claim 1, wherein the solids density of the kaolin stream exposed to said magnetic field in generally 5% or lower.

8. The kaolin enhancing process of claim 7, wherein the magnetic field is in the range of 10,000 to 30,000 gauss.

9. The kaolin enhancing process of claim 7, wherein the paramagnetic materials are zero magnetic materials ilite and ilmenite.

10. The kaolin enhancing process of claim 1, wherein the rejected plus 2 micron stream is subjected to further size reduction, and the reduced stream is recycled to the high intensity magnetic field or to before the quiescent alkaline first froth flotation separation.

11. The kaolin enhancing process of claim 1, wherein the leaching is carried out below a pH of 3, to remove residual metals.

12. The kaolin enhancing process of claim 11, wherein the leaching is carried out using sulphurous sulphuric acid, or hydrochloric acid.

13. The kaolin enhancing process of claim 11, wherein the residual metals include copper, zinc, non-magnetic iron and trace of metal oxides.

14. The kaolin enhancing process of claim 1, wherein thickening is obtained by settlement of the kaolin-bearing float tails.

15. The kaolin enhancing process of claim 1, wherein acidification prior to the second acidic float uses sulphur dioxide.

16. The kaolin enhancing process of claim 1, wherein a disc filter is used to dewater and recover the kaolin from the leached minus 2 micron stream.

17. The kaolin enhancing process of claim 1, wherein the dewatered kaolin stream is repulped and subjected to an oxidizing operation to further enhance brightness.

18. The kaolin enhancing process of claim 17, wherein the oxidizing agent is ozone or sodium chlorate.

19. The kaolin enhancing process of claim 18, wherein the oxidized minus 2 micron kaolin stream is further flocculated with aluminum sulphate.

20. The kaolin enhancing process of claim 17 wherein the kaolin stream is calcined to further en surface brightness.

21. The kaolin enhancing process of claim 18, wherein the kaolin stream is further dewatered to produce a kaolin slurry or cake.

22. The kaolin enhancing process of claim 21, wherein the kaolin cake is dried and subjected to electro precipitators to remove additional silicas.

23. The kaolin enhancing process of claim 1, wherein the other minerals in the kaolin-bearing ore are minerals based on metals including one or more of iron, titanium, zirconium, copper, zinc, calcium, potassium, sodium, magnesium.

24. A process for producing kaolin of enhanced brightness from kaolinized sand deposits containing silica, quartz, feldspar, ilmenite or other minerals and having a low grade and brightness level, comprising the steps of:
  extracting kaolin-bearing ore from said deposits;
  reducing the size of said ore and rejecting material of greater than 35 micron size;
  subjecting the minus 35 micron kaolin-bearing material to a first froth floatation separation operation under quiescent alkaline conditions to separate the float concentrate from the float tails, wherein the first alkaline float has a pH between 9 and 11 and-uses organic collectors and mildly polar frothing agent to float impurities;
  rejecting the float concentrate containing at least a portion of the silica impurities;
  thickening and acidifying the kaolin-bearing float tails to a pH between 3 and 5;
  subjecting the float tails to a second froth floatation separation operation under quiescent acidic conditions of between pH 3 and 5, using fatty acids and ethylenediamine as collectors to float kaolin;;
  removing the second float concentrate as a kaolin-bearing stream;
  exposing the kaolin-bearing stream at a solids density of generally 5% to an intense magnetic field in the range of 10,000 to 30,000 gauss to separate and reject paramagnetic minerals from the kaolin stream;
  size classifying the kaolin-bearing stream from the intense magnetic field into at least two streams, one of which streams is a 2 micron stream containing particulate matter of generally 2 microns or less, and the remainder of said streams containing particulate matter generally greater than 2 micron;
  rejecting the streams of greater than 2 micron matter;
  leaching the generally 2 micron or less stream to dissolve ferrous iron;
  dewatering the 2 micron stream and recovering the kaolin therein.

25. The kaolin enhancing process of claims 1 or 24, wherein the recovered kaolin is repulped and subjected to an oxidizing operation to further enhance brightness, using ozone or sodium chlorate.

* * * * *